United States Patent [19]

Tobias et al.

[11] 4,140,729

[45] Feb. 20, 1979

[54] LINEAR POLYESTER COIL COATING COMPOSITION

[75] Inventors: Michael A. Tobias, Bridgewater; Conrad L. Lynch, Edison, both of N.J.

[73] Assignee: Mobil Oil Corporation, New York, N.Y.

[21] Appl. No.: 866,585

[22] Filed: Jan. 3, 1978

[51] Int. Cl.$^2$ .................. C08L 61/20; C08L 67/02
[52] U.S. Cl. .................. 260/850; 260/32.8 R; 260/33.2 R; 260/33.4 R; 260/33.6 R; 260/40 R; 528/302
[58] Field of Search .................. 260/850, 75 R

[56] References Cited

U.S. PATENT DOCUMENTS

| | | | |
|---|---|---|---|
| 3,678,128 | 7/1972 | Riemhofer et al. | 260/850 |
| 3,691,258 | 9/1972 | Riemhofer et al. | 260/850 |
| 3,804,920 | 4/1974 | Cunningham et al. | 260/850 |
| 3,829,530 | 8/1974 | Powanda | 260/850 |
| 3,852,375 | 12/1974 | Biethan et al. | 260/850 |
| 4,072,662 | 2/1978 | Van Der Linde et al. | 260/75 R |

*Primary Examiner*—Lucille M. Phynes
*Attorney, Agent, or Firm*—Charles A. Huggett; Hastings S. Trigg

[57] ABSTRACT

There are provided linear polyesters of 1,6-hexanediol, short chain alkylene glycol, a phthalic acid, and optionally adipic acid. These polyesters are combined with an aminoplast and acid catalyst to form coating compositions which, when applied to a substrate and baked, provide a coating having an outstanding combination of flexibility, hardness, adhesion, extendability, dry heat resistance, weather resistance, and exterior color fastness.

9 Claims, No Drawings

LINEAR POLYESTER COIL COATING COMPOSITION

BACKGROUND OF THE INVENTION

1. Field of the Invention

This invention is concerned with thermosettable, highly aromatic polyester coating compositions.

2. Description of the Prior Art

In U.S. Pat. No. 3,804,920, there is disclosed a linear, stiff polyester characterized by high aromatic content. When such polyesters are formulated in a coating composition, coated on a metal substrate, and baked, they yield a coating having poor flexibility characteristics. The poor flexibility is attributed to the high aromatic content.

On the other hand, although the polyester resins used in the formulations of this invention have a high aromatic content, they produce coatings having excellent flexibility properties. The excellent properties are possibly attributable to the diols used.

SUMMARY OF THE INVENTION

This invention provides a linear thermosettable polyester resin based upon 5–15 weight percent 1,6-hexanediol, 0–12 weight percent adipic acid, 25–35 weight percent 1,3-butanediol, 1,2-propanediol, neopentyl glycol, or a mixture of ethylene glycol and neopentyl glycol, and 50–70 weight percent of a phthalic acid component; said resin having a number average molecular weight of 1,500–5,000 and a combined acid number and hydroxyl number of 20–70 mg. KOH per gram of polyester.

It also provides a coating composition comprising the polyester and an aminoplast dissolved in an inert organic solvent and metal substrates coated therewith.

DESCRIPTION OF SPECIFIC EMBODIMENTS

Polyester Resins

One glycol component of the polyester resins is, specifically, 1,6-hexanediol. It is used in an amount between about 5 weight percent and about 15 weight percent, based upon the total weight of the reactants.

The other glycol component is 1,3-butanediol, 1,2-propanediol, neopentyl glycol, or a mixture of ethylene glycol and neopentyl glycol in which the weight ratio of ethylene glycol to neopentyl glycol is between about 0.3 and about 0.7. This glycol component is used in an amount between about 25 weight percent and about 35 weight percent, based upon the total weight of the reactants.

The phthalic acid component is isophthalic acid or mixtures of isophthalic acid and terephthalic acid or phthalic anhydride which mixtures contain between about 50 weight percent and about 70 weight percent isophthalic acid. The amount of phthalic acid component used is between about 50 weight percent and about 70 weight percent, based upon the total weight of the reactants.

Optionally, adipic acid may be a component of the polyester resins of this invention. The amount of adipic acid can be between zero (0) weight percent and about 12 weight percent of the total weight of the reactants.

The esterification reaction is carried out at temperatures between about 225° C. and about 250° C., for a period of time between about 2 hours and about 10 hours. An esterification catalyst can be used, such as dibutyltin oxide, dibutyltin dilaurate, and triphenyl phosphite, in catalytic amounts (0.05–0.2 weight percent). During the late stages of the esterification reaction, it is advantageous to use an aromatic hydrocarbon, such as toluene or xylene, to remove the remaining water of esterification by azeotropic distillation. After the reaction is complete, the polyester is reduced to about 60 weight percent non-volatile material (NVM) with an aromatic petroleum solvent boiling within the range of 150–270° C. The resultant resin will have a number average molecular weight of 1,500–5,000 and a combined acid number and hydroxyl number of 20–70 mg. KOH per gram of polyester.

Coating Compositions

The essential components of the coating compositions of this invention are the polyester resin, an aminoplast, an acid catalyst, and an organic solvent.

The material used to thermoset the coating is a conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins, and other aminoplast-aldehyde resins such as those triazine resins produced by the reaction of an aldehyde with formoguanamine, ammeline, 2-chloro-4,6-diamino-1,3,5triazine, 6-methyl-2,4-diamino-1,3,5-triazine, 2,4,6-trihydrazine-1,3,5-triazine, and 2,4,6-triethyl-triamino-1,3,5-triazine. Generally, such resins are alkylated with an alcohol, such as methanol or butanol. As aldehydes used to react with the amino compounds to form the resinous material, one may use such aldehydes as formaldehyde, acetaldehyde, crotonaldehyde, acrolein, or compounds which engender aldehydes, such as hexamethylene- tetramine, paraldehyde, paraformaldehyde, and the like. The amount of aminoplast used is between about 10 weight percent and about 20 weight percent on resin solids.

The acid catalyst can be the acid itself or a derivative that will generate the acid in situ, such as commercially available Aerosol OT which generates sulfonic acid and $NH_4NO_3$ which can be decomposed to $HNO_3$. Acids that generally are used to cure aminoplast systems include p-toluene sulfonic acid (pTSA), benzenesulfonic acid, methylsulfonic acid, cyclohexyl sulfonic acid, phosphoric acid, mono- or dialkyl acid phosphates, and many others indicated in the art as suitable curing catalysts. The amount of acid catalyst used usually is between about 0.1 weight percent and about 1.0 weight percent, based upon total resin solids.

The solvents utilizable in the coating compositions of this invention are the usual volatile solvents used in paints and enamels. Aromatic hydrocarbons are utilizable, such as toluene, xylene, and aromatic petroleum cuts, e.g., Hi-Sol 4-1 (boils 190.6–260.0° C.) and Solvesso 100 (boils 155.6–172.2). Ketones utilizable include methyl isobutyl ketone (MIBK), isophorone, ethyl amyl ketone, and methyl n-amyl ketone. Alcohols are utilizable, such as butanol, amyl alcohol, 2-ethylhexanol, and cyclohexanol. Also utilizable are the ether alcohols and their acetate esters, such as methoxyethanol, ethoxyethanol, butoxyethanol, hexoxyethanol, methoxypropanol, methoxyethyl acetate, and ethoxyethyl acetate. It is within the contemplation of this invention to use mixtures of two or more solvents. The proportion of solvents used is not critical, since they are the volatile vehicle to convey the solid material to the substrate to be coated. The total amount of solvents used will be sufficient to provide a solids content (% NVM) of between about 50 weight percent and about 75 weight percent in the finished coating composition.

It is preferred to incorporate a pigment into the coating composition of this invention. The preferred pigment is titanium dioxide, but any well-known pigment can be used, such as zinc oxide, bentonite, silica, ochers, and chrome yellows, greens, oranges, etc. Sufficient pigment is used to provide an opaque or colored film as needed for the desired appearance.

Other well-known adjuvants may be added to the coating composition, such as flow control agents, wetting agents, and waxes.

The coating compositions of this invention can be applied to the usual substrates, i.e., metal, paper, leather, cloth, etc., using any of the usual methods of application including spraying, direct rollcoating, reverse rollcoating, electrodeposition, flow coating, and the like. The coating composition is primarily useful for coating aluminum, steel, tin plated steel, electrogalvanized steel, and hot dipped galvanized steel. Such metal substrates are usually cleaned and chemically treated to improve the wetting and adhesion of subsequent organic coatings. The coating compositions of this invention are equally useful for primers or topcoats with either the same or different types of resinous compositions. After coating the substrate, the coating is baked for about 5 seconds to about 25 minutes at between about 250° F. and about 600° F. A typical fast bake is for about 40 seconds at about 470–490° F.

The following examples demonstrate the preparation of the polyester resins of this and coating compositions containing them, along with performance characteristics of such coatings.

EXAMPLE 1

A 10 gallon pilot reactor was charged with 7342 grams of 1,3-butanediol, 2503 grams of 1,6-hexanediol, 730 grams of adipic acid, 14,400 grams of isophthalic acid and 25 grams of dibutyltin oxide. The contents of the reaction vessel were gradually heated to 235° C. while removing the water of reaction through a steam jacketed distillation column. When an acid number of 19.0 was obtained, 750 grams of xylene were added to azeotropically remove the remaining water produced by esterification. The reaction was continued until an acid number of 2.0 was obtained. The resulting polyester was reduced to 60 percent non-volatiles by the addition of Hi-Sol 4-1 solvent to afford a material with an acid number of 1.6, a hydroxyl number of 36.5, a Gardner Holdt viscosity of Z3, a Gardner Color of 2, a weight of 9.13 lbs./gal., and a number molecular weight of 3765.

This polyester solution was combined with 10% of hexamethoxymethylmelamine crosslinker on resin solids, pigmented with $TiO_2$ pigment at a pigment/resin ratio of 1/1, catalyzed with 2.0% on resin solids of a 20% para-toluenesulfonic acid solution, and reduced with ethoxyethyl acetate and Solvesso 100 to 65% NVM. This paint when applied to 20 mil cold rolled steel at 0.8 mils DFT and baked 40 seconds at 490° F. showed excellent film properties for coil coatings. Gloss was 80, MEK double rubs were greater than 100, pencil hardness was H-2H, a 2T-Bend and 120 inch reverse impact were both perfect, and there was no failure on a 200° F. for 10 minutes dry heat test.

EXAMPLES 2 THROUGH 16

The following table contains examples of linear thermosetting polyesters which were prepared by the same technique as that of Example 1.

Table I

| | Polyester Composition, Wt. % | | | | Properties | | | |
|---|---|---|---|---|---|---|---|---|
| Example | Diol(s) | 1,6 Hexanediol | Adipic Acid | Acid(s) | A.N.[1] | Hyd.N.[2] | Mn[3] | Mw[3] |
| 2 | 29.28[4] | 10.05 | 8.88 | 51.79[10] | 0.3 | 45 | 3792 | 6554 |
| 3 | 29.17[4] | 10.01 | 5.92 | 54.90[10] | 1.3 | 46 | 4033 | 7279 |
| 4 | 29.17[4] | 10.01 | 5.92 | 54.90[10] | 11.4 | 55 | 1780 | 4580 |
| 5 | 28.98[4] | 10.06 | 2.94 | 58.01[10] | 1.1 | 43 | 3989 | 7085 |
| 6 | 28.98[4] | 10.06 | 2.94 | 58.01[10] | 8.7 | 51 | 1930 | 5000 |
| 7 | 28.92[4] | 10.04 | 1.47 | 59.57[10] | 1.1 | 42 | 3826 | 7105 |
| 8 | 28.86[4] | 10.03 | 0.00 | 61.11[10] | 1.3 | 45 | 3845 | 6782 |
| 9 | 33.24[4] | 5.10 | 3.72 | 57.94[10] | 1.5 | 45 | 3801 | 6957 |
| 10 | 28.98[4] | 10.06 | 2.94 | 58.01[11] | 1.7 | 45 | 3590 | 9340 |
| 11 | 28.98[4] | 10.06 | 2.94 | 58.02[12] | 1.1 | 26 | 3654 | 6259 |
| 12 | 26.26[5] | 10.20 | 11.46 | 52.08[10] | 2.5 | 44 | 3579 | 6426 |
| 13 | 31.87[6] | 9.97 | 6.17 | 51.99[10] | 0.6 | 42 | 3721 | 7084 |
| 14 | 28.08[7] | 9.28 | 0.00 | 62.64[11] | 1.1 | 47 | 3727 | 6637 |
| 15 | 28.23[8] | 9.33 | 4.16 | 58.28[11] | 1.0 | 48 | 3672 | 6716 |
| 16 | 23.35[9] | 16.13 | 0.00 | 60.52[11] | 0.9 | 50 | 3915 | 6991 |

Footnotes:
1. Acid number equals mg. KOH per gram polyester.
2. Hydroxyl number equals mg. KOH per gram polyester.
3. Number and weight average molecular weight as determined by gel permeation chromatography vs. a polystyrene standard.
4. 1,3-Butanediol.
5. 1,2-Propanediol.
6. Neopentyl Glycol.
7. 10.72% Ethylene glycol plus 17.36% Neopentyl glycol.
8. 10.77% Ethylene glycol plus 17.46% Neopentyl glycol.
9. 6.58% Ethylene glycol plus 16.77% Neopentyl glycol.
10. Isophthalic acid.
11. 50.00% Isophthalic plus 50.00% terephthalic acid.
12. 70.00% Isophthalic acid plus 30.00% phthalic anhydride.

EXAMPLE 17

The polyester solution from Example 4 was combined with 15% of hexamethoxymethylmelamine crosslinker, pigmented with $TiO_2$ pigment at a pigment/resin ratio of 0.9/1, catalyzed with 1.9% on resin solids of a 20% pTSA solution, and reduced to 70.5% NVM with ethoxyethyl acetate and Solvesso 100. This paint was applied at 0.8 mils dry film thickness (DFT) on 20 mil cold rolled steel panels treated with Bonderite 901 and baked at 470° F. for 40 seconds. Gloss was 78, pencil hardness was H to 2H, MEK double rubs were greater than 100. The coating passed a 3T-Bend with no cracking or loss of adhesion when tested with Scotch tape. It also passed an 80 inch-lb. reverse impact with no cracks or loss of Scotch tape adhesion.

Another sample of paint was made from the polyester as above but with the acid catalyst level reduced to 0.75% on resin solids. This paint was applied at 0.8 mils DFT on 18 mil electrogalvanized steel and baked at 470° F. for 40 seconds. Gloss was 95, pencil hardness was F to H, MEK double rubs were greater than 100 and the coating passed a 1T-Bend with no micro cracks or loss of Scotch tape adhesion.

The polyester solution from Example 4 was combined with 20% of a butylated glycoluril crosslinker, pigmented with $TiO_2$ pigment at a pigment/resin ratio of 1/1, catalyzed with 3% on resin solids of a 20% pTSA solution, and reduced to 66.7% solids with ethoxyethyl acetate and Solvesso 100. This paint when applied at 0.8 mils DFT on 20 mil cold rolled steel treated with Bonderite 901 and baked at 470° F. for 40 seconds showed a 77 gloss, F-H pencil hardness, greater than 100 MEK double rubs. It passed a 2T-Bend and a 120 in.-lb. reverse impact with no cracks or loss of Scotch tape adhesion.

EXAMPLE 18

The polyester solution from Example 5 was combined with 10% of hexamethoxymethylmelamine crosslinker (Cymel 303) on resin solids, pigmented with $TiO_2$ pigment at a pigment/resin ratio of 1/1, catalyzed with 2.0% of a 20% pTSA solution, and reduced to 65.4% NVM with ethoxyethyl acetate and Solvesso 100. This coating when applied at 0.8 mils DFT on 20 mil cold rolled steel treated with Bonderite 901 and baked at 490° F. for 40 seconds showed excellent paint film properties. Gloss was 80, MEK double rubs were greater than 100, pencil hardness was H to 2H and the coating passed a 2T-Bend and 120 inch-lb. reverse impact with no cracking or loss of adhesion.

Another paint was made from the polyester of Example 5 by combining it with 15% of a hexabutoxymethylmelamine cross-linker on resin solids, pigmented with $TiO_2$ pigment at a pigment/resin ratio of 0.9/1, catalyzed with 1.9% on resin solids of a 20% pTSA solution, and reduced to 68.0% NVM with ethoxyethyl acetate and Solvesso 100. This paint was applied on 20 mil cold rolled steel treated with Bonderite 901 at 0.8 mils DFT and baked at 470° F. for 40 seconds. Gloss was 85, pencil hardness was H to 2H, MEK double rubs were greater than 100, and the coating passed a 2T-Bend and 180 inch-lbs. reverse impact with no cracks or loss of Scotch tape adhesion. The 2-T-Bends showed no cracking or "popping" when subjected to a dry heat test by reheating at 200° F. for 10 minutes.

This paint was applied at 0.9 mils DFT on a 25 mil chemically treated aluminum panel baked at 510° F./40" and exposed at 45° south at Miami, Fla., for 1 year without showing any chalking or other evidence of film deterioration.

EXAMPLE 19

The polyester solution from Example 8 was combined with 15% of hexamethoxymethylmelamine crosslinker on resin solids, pigmented with $TiO_2$ pigment at a pigment/resin ratio of 0.9/1, catalyzed with 1.9% on resin solids of a 20% pTSA solution and reduced to 68.1% NVM with ethoxyethyl acetate and Solvesso 100. This paint was applied on 20 mil cold rolled steel treated with Bonderite B901 and baked at 490° F. for 40 seconds. The gloss was 80, MEK rubs were greater than 100, pencil hardness was 2H-3H, and a 3T-Bend and 160 inch/lb. reverse impact showed no cracking or loss of adhesion when tested with Scotch Tape. This paint was also coated on chemically treated 25 mil aluminum, baked at 510° F./40" and exposed in Florida for 1 year without showing any chalking or other evidence of film deterioration.

EXAMPLE 20

The polyester resin solution from Example 12 was combined with 15% of a hexamethoxymelamine crosslinker on resin solids, pigmented with an exterior grade of $TiO_2$ pigment at a pigment/resin ratio of 0.9/1, catalyzed with 2.5% on resin solids of a 20% pTSA solution, and reduced to 68.7% NVM with ethoxyethyl acetate and Solvesso 100. This paint when applied on 25 mil Alodized Aluminum at 0.8 mils DFT and baked at 470° F. for 40 seconds showed excellent film properties. Gloss was 96, MEK double rubs were greater than 100, pencil hardness was H-2H, and the coating passed a OT-Bend and 24 inch-lb. reverse impact with no cracking or loss of Scotch tape adhesion. Panels of this coating exposed at 45° South in Miami, Fla., showed no significant loss of gloss, chalking, or other change after 27 months.

EXAMPLE 21

The polyester solution from Example 13 was combined with 15% of hexamethoxymethylmelamine crosslinker on resin solids, pigmented with $TiO_2$ pigment at a pigment/resin ratio of 1/1, catalyzed with 1.3% of a 20% pTSA solution, and reduced to 71.5% NVM with ethoxyethyl acetate and butanol. This paint was baked at 470° F. for 40 seconds on 25 mil Alodized Aluminum panels at 0.8 mils DFT. The coated panels showed an 86 gloss, greater than 100 MEK double rubs, a pencil hardness of F-H, and passed a 2T-Bend and 24 inch-lb. reverse impact with no cracks or loss of Scotch tape adhesion.

EXAMPLE 22

The polyester resin solution from Example 14 was combined with 10% of a hexamethoxymethylmelamine crosslinker on resin solids, pigmented with $TiO_2$ pigment at a pigment/resin ratio of 1/1, catalyzed with 2.0% on resin solids of a 20% pTSA solutin, and reduced to 65.0% NVM with MIBK and isophorone. This paint when applied to 20 mil cold rolled steel treated with Bonderite 901 at 0.8 mils DFT and baked at 490° F. for 40 seconds showed an 82 gloss, 2H to 3H pencil hardness, greater than 100 MEK double rubs, and passed a 3T bend and 160 inch-lb. reverse impact with no cracks or loss of Scotch tape adhesion. This coating showed excellent stain resistance when tested with iodine, shoe polish, catsup, mustard, chlorox, and lipstick which are typical reagents used to test applicance coatings.

The butylated glycoluril crosslinker used in Example 17 has the structure:

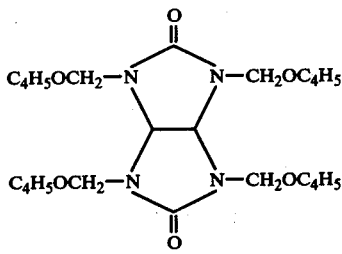

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A coating composition comprising a linear thermosetting polyester resin based upon, by weight of the total weight of reactant, between about 5 percent and about 15 percent 1,6-hexanediol; between about 25 percent and about 35 percent 1,3-butanediol, 1,2-propanediol, neopentyl glycol, or a mixture of ethylene glycol and neopentyl glycol in a weight ratio of ethylene glycol to neopentyl glycol of between about 0.3 and about 0.7; between about 50 percent and about 70 percent phthalic acid component; and between zero percent and about 12 percent adipic acid; said resin having a number average molecular weight of 1,500–5,000 and a combined acid number and hydroxyl number of 20–70 mg. KOH per gram of polyester, between about 10 weight percent and about 20 weight percent on resin solids of an aminoplast, between about 0.1 and 1.0 weight percent on resin solids of an acid catalyst and an inert organic solvent in an amount sufficient to provide a solids content of between about 50 weight percent and about 75 weight percent.

2. The composition of claim 1 containing a pigment.

3. The composition of claim 2, wherein said pigment is titanium dioxide.

4. The composition of claim 3, wherein said aminoplast is hexamethoxymethylmelamine.

5. A coating composition comprising the polyester resin defined in claim 1 based upon, by weight of the total weight of reactants, about 10.0 percent 1,6-hexanediol; about 29.4 percent 1,3-butanediol; about 57.7 percent isophthalic acid; and about 2.9 percent adipic acid; said resin having a number average molecular weight of 3765 and a combined acid number and hydroxyl number of 38.1 mg. KOH per gram of polyester, about 10 weight percent on resin solids of hexamethyoxymethylmelamine, about 0.4 weight percent on resin solids of para-toluene sulfonic acid, TiO₂ pigment at a pigment/resin ratio of 1/1, and an inert organic solvent in an amount sufficient to provide a solids content of about 65 weight percent.

6. A coating composition comprising the polyester resin defined in claim 1 based upon, by weight of the total weight of reactants, about 10.0 percent 1,6-hexanediol; about 28.9 percent 1,3-butanediol; about 61.1 percent isophthalic acid; and zero percent adipic acid; said resin having a number average molecular weight of 3845 and a combined acid number and hydroxyl number of 46.3 mg. KOH per gram of polyester.

7. A coating composition comprising the polyester resin defined in claim 1 based upon, by weight of the total weight of reactants, about 10.2 percent 1,6-hexanediol; about 26.3 percent 1,2-propanediol; about 52.1 percent isophthalic acid; and about 11.5 percent adipic acid; said resin having a number average molecular weight of 3579 and a combined acid number and hydroxyl number of 46.5 mg. KOH per gram of polyester, about 15 weight percent on resin solids of hexamethoxy-methylmelamine, about 0.5 weight percent on resin solids of para-toluenesulfonic acid, TiO₂ pigment at a pigment/resin ratio of 0.9/1, and an inert organic solvent in an amount sufficient to provide a solids content of about 68.7 weight percent.

8. A coating composition comprising the polyester resin defined in claim 1 based upon, by weight of the total weight of reactants, about 10.0 percent 1,6-hexanediol; about 31.9 percent neopentyl glycol; about 52.0 percent isophthalic acid; and about 6.2 percent adipic acid; said resin having a number average molecular weight of 3721 and a combined acid number and hydroxyl number of 42.6 mg. KOH per gram of polyester, about 15 weight percent on resin solids of hexamethoxymethylmelamine, about 0.3 weight percent on resin solids of para-toluenesulfonic acid, TiO₂ pigment at a pigment/resin ratio of 1/1 and an inert organic solvent in an amount sufficient to provide a solids content of about 71.5 weight percent.

9. A coating composition comprising the polyester resin of claim 1, about 10 weight percent on resin solids of hexamethoxymethylmelamine, about 0.4 weight percent on resin solids of para-toluenesulfonic acid, TiO₂ pigment at a pigment/resin ratio of 1/1, and inert organic solvent in an amount sufficient to provide a solids content of about 65 weight percent.

* * * * *